United States Patent Office 3,415,320
Patented Dec. 10, 1968

3,415,320
METHOD OF TREATING CLAY-CONTAINING EARTH FORMATIONS
Bill M. Young, Duncan, Okla., assignor to Halliburton Company, Duncan, Okla., a corporation of Delaware
No Drawing. Filed Feb. 9, 1967, Ser. No. 614,794
18 Claims. (Cl. 166—33)

ABSTRACT OF THE DISCLOSURE

A method of consolidating loose or incompetent sands or earth formations containing clays, using a resin or plastic consolidating fluid and a clay treating material having the formula:

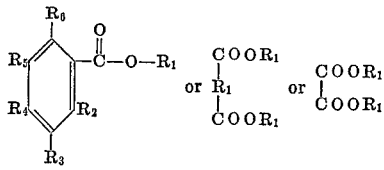

wherein, $R_1 = 1$ to 8 carbon atoms in a linear, alicyclic, aromatic, branched chain, or unsaturated arrangements or a combination thereof and

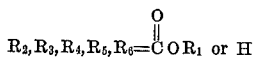

BACKGROUND OF THE INVENTION

The present invention relates to a new and improved method of treating earth formations and particularly to a method of consolidating loose sands or earthen formations containing clays or strengthening naturally consolidated formations.

The present invention especially relates to a new and improved sand consolidation wherein an in situ curing of a resinous or consolidating fluid is provided.

Various sand consolidation methods and techniques have been employed to prevent or inhibit sand movement with crude oil production. Some of the methods previously used are: gravel packing, use of various filter materials, the use of mechanical filters and screens, cementing with preservation of interstices, packing the formation with resin coated ground walnut hulls or other nut shells, wetting the unconsolidated sand with a bonding resin, and placing a resin treated sand between the loose sand in the formation and the well bore so as to form a screen. These methods have met with varying degrees of success.

More recently, considerable success in consolidating loose sands or particulated solids has been achieved with plastic or resin consolidating fluids, such as phenol-formaldehyde resins, epoxy resins and furfuryl alcohol resins. Use of this latter resin in particular has met with a high degree of success.

U.S. Patents Nos. 3,199,590, 3,209,826, 3,100,527, 3,176,768, 2,378,817, 2,476,015 2,490,291, 2,604,172, 3,022,825, 3,047,067 and 3,097,692 describe some of these prior art consolidation processes in detail.

It is an important object of the present invention to provide a new and improved permeable and consolidated barrier adjacent to a well bore so as to facilitate production of underground fluids essentially free of solids.

A primary object of the present invention is to provide a new and improved resinous, resin or plastic system for consolidating loose sands containing clays, especially clayey-shaley sands, and which system is also effective in calcareous and non-calcareous sands or formations, thus in effect to provide a consolidating system which may be universally used.

There exists a great need for conditioning chemicals and consolidating fluids which will permit treatment and/or consolidation of earth formations containing high percentages of water sensitive clays. Although the furfuryl alcohol resin system of U.S. Patent No. 3,199,590 has been effectively used for consolidating sands containing as much as 10% brine-hydrated bentonite under laboratory conditions, some difficulty has been experienced under actual field conditions.

The clay content of some formations, particularly in the Gulf Coast area, is so high that none of the prior art consolidating systems may be effectively used. The present invention is adapted to overcome this problem.

Steam injection programs and water flood projects are encountering difficulty because of clayey formations. Many high clay containing formations cannot be properly treated for stimulation to break emulsions, remove water blocks, etc., because stimulation fluids cannot be properly injected. The present invention provides a method of chemically treating these clayey formations for overcoming the prior art difficulties.

These and other objects of the present invention will be more readily understood from a reading of the following specification and reference to the examples forming a part thereof.

SUMMARY OF THE INVENTION

This invention broadly relates to a method of consolidating loose or incompetent earth formations or sands containing clays wherein the formation is treated with a clay treating chemical. Esters of aromatic polycarboxylic acids and particularly diethyl phthalate have been found to be especially good clay treating materials.

The clay treating chemical in most instances may be added to a resin solution or consolidating fluid, to an afterflush or catalyzed solution and to a preflush solution.

When the clay treating chemical is used as an additive to a consolidating system such as the furfuryl alcohol resin system of U.S. Patent No. 3,199,590, it has enhanced clay treating qualities, improves fluid penetration control and injection rates, permits a greater increase or stimulation in permeability of the resulting consolidation and improves the resistance of said consolidation to heat, steam and chemicals.

The clay treating chemical of the present invention is an additional component to a resin or plastic consolidating system. It is added in addition to any catalyst which may be used in the system or consolidating process.

Although the clay treating additive of the present invention is especially applicable in clayey-shaley sands or sands containing a significant amount of water-swelling clays, it provides additional benefits when used in sand consolidation treatments of all types of formations. The additive enables more of the difficult clay-containing sands to be treated, up to twice as much as similar consolidation systems not containing the additive. It promotes a greater increase or stimulation in permeability of consolidations of sands containing hydrated bentonite. It enhances the heat, steam and chemical resistance of consolidations of both clean and bentonitic sands. It improves the fluid control properties of the consolidating fluid. Interfacial tensions are lowered between treating solutions without any change in viscosity. More desirable sequential injection patterns of the treating fluids are obtained, as well as improved injection rates and more equalized penetration of fluids into high clay content formations.

The clay treating chemicals or additives of the present invention when employed in resin, plastic or other sand consolidation systems or methods may be used as a preflush solution or dissolved in a carrier such as oils or aromatic solvents or other suitable fluids. The additives may be dissolved or dispersed in a catalyzed or non-catalyzed resin, resin mixture or consolidating fluid in concentrations up to about 50% by volume with the preferred concentration in amounts up to about 25% parts by volume. The additive may also be dissolved or dispersed in an overflush solution, either with or without a curing agent for the resin being present, depending upon the particular resin or consolidating system used.

The clay treating additive of this invention is oil soluble. It is generally preferred that it be used in amounts of up to about 15% parts by volume of solution when added to the resin, catalyst, preflush or afterflush solutions.

The mineral oil used in this invention should be one which is not miscible with the consolidating fluid or resin solution, such as diesel oil, kerosene, crude oil, solar oil or the like.

DESCRIPTION OF THE PREFERRED EMBODIMENTS

Some organic esters which have been found to exhibit unexpected clay treating properties and which may be incorporated directly into a consolidating fluid, resin or plastic, in a preflush solution which is usually a mineral oil, with diesel oil being generally preferred, and in an afterflush solution which is also usually a mineral oil and which may or may not contain a catalyst depending upon the resin used, are the esters of mono and polycarboxylic substituted benzene and fused benzene rings, wherein the alcohol used to form the ester has from 1 to 8 carbon atoms. Esters of this type have general formulas as follows:

(1)

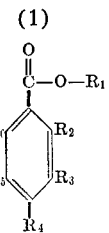

wherein, $R_1$ = an alkyl group having from 1 to 8 carbon atoms in either a saturated, unsaturated or branched chain arrangement; or an aromatic group

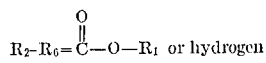

(2)

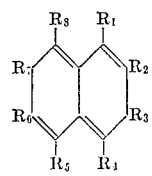

wherein, $R_1$–$R_8$ = H or

group with at least one

group

R = an alkyl group having from 1 to 8 carbon atoms in either a saturated, unsaturated or branched chain arrangement; or an aromatic group (3)

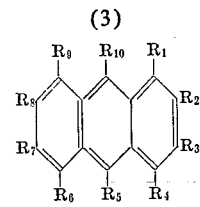

wherein, $R_1$–$R_{10}$ = hydrogen or

group with at least one

group present

R = an alkyl group having from 1 to 8 carbon atoms in either a saturated, unsaturated or branched chain arrangement; or an aromatic group Some other organic esters which exhibit unexpected clay treating qualities, and which may be incorporated directly in the consolidating fluid or into a preflush solution used ahead of the consolidating fluid, are the esters of mono and polycarboxylic aliphatic acids wherein the alcohol used to form the ester has from 1 to 10 carbon atoms. Esters of this type have general formulas as follows:

(4)

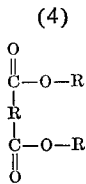

wherein,

R = an alkyl group having from 0 to 10 carbon atoms in a saturated, unsaturated or branched chain arrangement $R_1$ and $R_2$ = an alkyl group having from 1 to 10 carbon atoms in a saturated, unsaturated or branched chain arrangement (5)

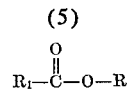

wherein,

R = an alkyl group having from 1 to 10 carbon atoms in a saturated, unsaturated or branched chain arrangement $R_1$ = hydrogen or an alkyl group having from 1 to 10 carbon atoms in a saturated, unsaturated or branched chain arrangement Some examples of these compounds are dimethyl phthalate, diethyl phthalate, dibutyl phthalate, dioctyl phthalate, diallyl phthalate, diphenyl phthalate, diallyl terephthalate, diethyl terephthalate, diethyl oxalate and ethyl malonate.

Resin systems usable in combination with these clay-treating additives are furfuryl alcohol, aldehyde-phenol, epoxy, phenol-furan, furan-aldehyde, urea-formaldehyde, urea-aldehyde-furan and urethanes.

The clay treating chemicals of the present invention have been extensively tested in several commercial sand consolidation systems or processes, namely a furan (furfuryl alcohol) resin system, an epoxy resin system and a phenol-formaldehyde resin system.

The results of these tests are recorded hereinbelow.

General procedures used for effecting laboratory sand consolidations for evaluation A section of glass or Lucite tubing or cylinder of a predetermined size and length containing a Buna N rubber or Tygon insert was vertically mounted on a ring stand. A perforated rubber stopper was inserted in the lower end of the tubing or column. A small section of copper wire screen was positioned over the perforations, and over this screen was placed a thin section of glass wool.

For each test, a predetermined amount of solids (sand and/or clays) were packed into the tubing. In most instances prior to consolidation, the solids were treated with a standard brine solution and mineral oil. The treating fluids were then injected or flushed through the solids at a fluid pressure of from 3 to 50 p.s.i.g.

After treatment, the perforation in the rubber stopper was plugged and the entire assembly was placed in a constant temperature bath (maintained a fluid injection temperature). After sufficient interval of time to permit proper curing or hardening of the resin or consolidating fluid, the consolidated specimen was allowed to cool, if necessary, to 80° F. Subsequently the core was trimmed and segmented into short sections and compressive strength and/or air permeability tests or measurements were made on each section of the cores. Before permeability tests were performed, the consolidations were flushed with large volumes of naphthalene and subsequently dried at 200° F. in a vacuum oven.

MATERIALS

Standard brine solution.—An average oil field brine consisting of 240:18:1.34:1 parts by weight respectively, of $H_2O$, $NaCl$, $CaCl_2$ and $MgCl_2.6H_2O$.

Diesel oil.—A standard commercial grade of diesel oil.

Oklahoma No. 1 sand.—A white Oklahoma sand essentially free of acid soluble materials and water swellable clays, composed of approximately 99% sand grains ranging from 60–200 mesh (U.S. Standard) in size.

Clay.—Halliburton-gel, a ground colloidal montmorillonite clay whose common name is bentonite.

Furfuryl alcohol resin system

Furfuryl alcohol resin.—Durez 21687 furfuryl alcohol resin.

Furfuryl alcohol.—Commercial grade of furfuryl alcohol.

Silane.—Gamma aminopropyltriethoxy silane.

Surfactant.—Halliburton Hyflo, an oil soluble commercial surface active agent, a blend of alkyl aryl sulfonates and complex nonionics.

Catalyst.—Trichloroacetic acid (TCA) unless otherwise stated.

Water.—Tap water from Duncan, Okla. water supply.

Epoxy resin system

Epoxy resin.—Epon 828 made by Shell Chemical Corp., a homolog of diglycidyl ether of bisphenol A. It is a liquid at room temperature, has an epoxide equivalent of from 175 to 210, an average molecular weight of 350 to 400, and a viscosity of from 5000 to 15,000 centipoises at 25° C.

Curing agent.—Laromine C–260, an amino polymer curing agent.

Solvent.—E–407R, an aromatic solvent.

Phenol.—85% in water and methanol.

Isopropanol.—Commercial grade of isopropyl alcohol.

Phenolic resin system

Phenol formaldehyde resin.—Durez 2158 phenol formaldehyde resin.

Silane.—Gamma aminopropyltriethoxy silane.

Catalyst.—Trichloroacetic acid (TCA).

EXAMPLE A

Comparative consolidation strengths and permeability data using furfuryl alcohol resin system in bentonitic sands with and without clay treating additive

Procedure

3–6 inches of solids (Oklahoma No. 1 sand and/or bentonite) were packed in a 1″ I.D. thick-walled glass cylinder and treating liquids were injected at 50 p.s.i.g. at various temperatures. Test solids contained from 0%–10% bentonite. Various amounts of diethyl phthalate (DEP) were added to the consolidating liquid.

MATERIALS IN ORDER OF INJECTION

|  | P.B.W. | P.B.V. | Amount, cc. |
|---|---|---|---|
| Standard Brine | | | 100 |
| Preflush: | | | |
|   Diesel oil | 100.00 | 100 | |
|   Hyflo | 0.5 | 1 | 50 |
| Consolidating Liquid: | | | |
|   Furfuryl alcohol resin | 121.00 | 100 | |
|   Furfuryl alcohol | 226.00 | 200 | |
|   Water | 10.00 | 10 | |
|   Silane | 1.43 | 1.5 | |
|   Hyflo | 1.42 | 1.5 | (1) |
| Spacer: | | | |
|   Diesel oil | 100.00 | 100 | |
|   Hyflo | 0.25 | 0.5 | 250 |
| Catalyst (Afterflush): | | | |
|   Diesel oil | 82.00 | | |
|   TCA | 1.00 | | |
|   Hyflo | .48 | | 250 |

[1] Variable.

TABLE I.—COMPRESSIVE STRENGTH AND PERMEABILITY TESTS AFTER 18 HOURS AT 140° F.

| Percent Bentonite in Test Sands | Percent DEP in Consolidating Liquid | Permeability, Darcies | Compressive Strength, p.s.i. |
|---|---|---|---|
| (1) | (1) | 4.2 | 836 |
| (1) | 8.56 | 5.83 | 1,661 |
| 0.5 | (1) | 6.5 | 1,102 |
| 0.5 | 8.65 | 7.28 | 1,529 |
| 1.0 | (1) | 6.11 | 705 |
| 1.0 | 8.56 | 5.79 | 1,075 |
| 1.25 | (1) | 2.5 | 688 |
| 1.25 | 8.56 | 6.4 | 1,429 |
| 2.0 | (1) | 3.8 | 955 |
| 2.0 | 8.56 | 5.65 | 1,205 |
| 2.5 | (1) | 2.7 | 950 |
| 2.5 | 8.56 | 5.87 | 759 |
| 3.75 | (1) | 1.5 | 814 |
| 3.75 | 8.56 | 2.59 | 1,295 |
| [2] 4.0 | (1) | --- | 1,457 |
| [2] 4.0 | 10 | --- | 2,861 |
| 4.0 | (1) | 1.96 | 1,104 |
| 4.0 | 10 | 2.00 | 1,774 |
| 5.0 | (1) | 0.7 | 911 |
| 5.0 | 8.56 | 2.92 | 982 |
| 10.0 | (1) | --- | [3] 680 |
| 10.0 | 10 | 0.5 | [4] 1,290 |

| Percent DEP in Preflush | | | |
|---|---|---|---|
| 4.0 | (1) | --- | 1,104 |
| 4.0 | 10 | --- | 1,270 |

[1] None.
[2] Hexachloroacetone as catalyst.
[3] Consolidating fluids were injected with great difficulty and in an uneven manner. Some parts of the sand were not consolidated. Only the upper 1″ section of a 3½–4″ long core was sufficiently consolidated to obtain compressive strength measurements.
[4] Consolidating fluids were injected with ease and uniformity into test sand. Test sand was completely consolidated and was strong throughout the core. Flow rate was greater than associated with test.

EXAMPLE B

Comparative consolidation strengths and permeability tests were made using various resin systems in clayey sands, with various clay treating additives. Tables II–VII, hereinbelow, describe the various formulations of consolidating, preflush, spacer and afterflush solutions used in the tests. Tables VIII–XII set forth the results of the consolidation and permeability tests.

TABLE II.—PREFLUSH AND SPACER SOLUTIONS USED WITH FURFURYL ALCOHOL AND PHENOL FORMALDEHYDE RESINS

| | Components, Parts by Volume | | |
|---|---|---|---|
| | Diesel oil | Hyflo | Diethyl phthalate |
| Formulation No.: | | | |
| P 1 | 100 | 1 | 0 |
| P 2 | 100 | 1.5 | 50 |
| P 3 | 0 | 0 | 100 |
| S 1 | 100 | 0.5 | 0 |

TABLE III.—FURFURYL ALCOHOL RESIN CONSOLIDATING SOLUTIONS

Basic consolidating fluid, parts by volume:
　Resin, 100.
　Silane, 1.5.
　Furfuryl alcohol, 200.
　Surfactant, 1.5.
　Water, 10.

| | Clay Treating Additive Parts By Volume | |
|---|---|---|
| | Additive | Amount |
| Formulation No.: | | |
| FAR 1 | None | |
| FAR 2 | Diethyl phthalate | 30 |
| FAR 3 | Diallyl phthalate | 5 |
| FAR 4 | Dioctyl phthalate | 5 |
| FAR 5 | Ethyl benzoate | 15 |
| FAR 6 | Diallyl terephthalate | 30 |
| FAR 7 | Diphenyl phthalate | 30 |
| FAR 8 | Ethyl-1-naphthoate | 5 |
| FAR 9 | Diethyl malonate | 5 |
| FAR 10 | Hexyl acetate | 15 |
| FAR 11 | Propiolactone | 15 |
| FAR 12 | Ethyl phthalyl ethyl glycolate | 15 |

TABLE IV.—AFTERFLUSH, CATALYST SOLUTION FOR FURFURYL ALCOHOL AND PHENOL FORMALDEHYDE RESINS

| | Chemical Components, Parts by Weight | | | |
|---|---|---|---|---|
| | Diesel oil | Hyflo | TCA | Diethyl phthalate |
| Formulation No.: | | | | |
| FAC 1 | 422 | 2.4 | 4.8 | 0 |
| FAC 2 | 295 | 1.7 | 4.7 | 0 |
| FAC 3 | 295 | 1.7 | 4.7 | 39.4 |

TABLE V.—PHENOL FORMALDEHYDE RESIN CONSOLIDATING SOLUTIONS

| | Chemical Components, Parts by Volume | | | |
|---|---|---|---|---|
| | Resin | Silane | Furfuryl alcohol | Diethyl phthalate |
| Formulation No.: | | | | |
| PFR 1 | 100 | 1.25 | 100 | 0 |
| PFR 2 | 100 | 1.25 | 100 | 30 |

TABLE VI.—PREFLUSH SOLUTIONS USED WITH EPOXY RESINS

| | Chemical Components, Parts by Volume | | | |
|---|---|---|---|---|
| | Diesel oil | Isopropyl alcohol | Solvent | Diethyl phthalate |
| Formulation No.: | | | | |
| EP 1 | 100 | 0 | 0 | 0 |
| EP 2 | 0 | 100 | 0 | 0 |
| EP 3 | 100 | 0 | 100 | 0 |
| EP 4 | 100 | 0 | 100 | 100 |

TABLE VII.—EPOXY RESIN CONSOLIDATING SOLUTIONS

| | Chemical Components, Parts by Volume | | | |
|---|---|---|---|---|
| | Resin [1] | Curing Agent [2] | Catalyst [3] | Diethyl phthalate |
| Formulation No.: | | | | |
| ER 1 | 100 | 100 | 12 | 0 |
| ER 2 | 100 | 100 | 12 | 5 |

[1] Epon 828 resin (30% by weight) dissolved in Shell E407R aromatic solvent.
[2] Amine curing agent dissolved (1.4–1.6% by wt.) in Shell E407R aromatic solvent.
[3] 50% by wt. of phenol dissolved in Shell E407R aromatic solvent.

Test results are illustrated in Tables VIII, IX, X XI and XII hereinbelow. As can be seen the better clay-treating chemicals were those which were composed of a phthalate structure. Some improvement in permeability retention was obtained by using an aliphatic dicarboxylic acid, diethyl malonate.

The effective utilization of certain phthalate additives in phenol formaldehyde and epoxy resin systems is shown in Tables XI and XII. A diethyl phthalate preflush greatly improved the clayey sand treating ability of the epoxy system.

TABLE VIII.—FURFURYL ALCOHOL RESIN STUDIES 80° F. TESTS PROCEDURE (a)

Preflush, 200 cc. P 1 (100 cc. with clean sand).
Resin, 60 cc. (4% clay).
Resin, 80 cc. (10% clay).
Resin, 50 cc. (clean sand).
Spacer, 250 cc.
Afterflush, 500 cc. FAC 1.

| Formulation | Clay Treating Additive in Resin | Type Sand | Consolidation Properties | |
|---|---|---|---|---|
| | | | Strength, p.s.i. | Permeability, Darcies |
| FAR-1 | None | Clean | 1,340 | |
| FAR-2 | Diethyl phthalate | do | 1,455 | |
| FAR-1 | None | 4% Bentonite [1] | 1,108 | 2.61 |
| FAR-2 | Diethyl phthalate | do [1] | 1,330 | 4.08 |
| FAR-1 | None | 10% Bentonite [1] | 375 | 0.69 |
| FAR-2 | Diethyl phthalate | do [1] | 402 | 1.36 |
| FAR-3 | Diallyl phthalate | 4% Bentonite [1] | 1,230 | |

[1] Hydration of clays prior to consolidation attempts were made with a synthetic brine solution.

TABLE IX.—FURFURYL ALCOHOL RESIN STUDIES 110° F. TESTS PROCEDURE (b)

4% Brine Hydrated Bentonitic Sands.
Preflush, 150 c. P 1.
Resin, 100 cc.
Spacer, 250 cc.
Afterflush, 350 cc. FAC 2.

| Resin Formulation | Clay Treating Additive in Resin | | |
|---|---|---|---|
| | Additive | Consolidation Compressive Strength, p.s.i. | Properties Permeability, Darcies |
| FAR-1 | None | 903 | 2.24 |
| FAR-2 | Diethyl phthalate | 1,130 | 2.55 |
| FAR-3 | Diallyl phthalate | 1,060 | 2.96 |
| FAR-4 | Dioctyl phthalate | 920 | 2.48 |
| FAR-5 | Ethyl benzoate | 1,200 | 2.74 |
| FAR-6 | Diallyl terephthalate | 1,225 | 2.69 |
| FAR-7 | Diphenyl phthalate | 1,143 | 2.71 |
| FAR-8 | Ethyl-1-naphthoate | 933 | 2.05 |
| FAR-9 | Diethyl malonate | 898 | 2.4 |
| FAR-10 | Hexyl acetate | 946 | 2.25 |
| FAR-11 | Propiolactone | 563 | 2.11 |
| FAR-12 | Ethyl phthalyl ethyl glycolate | 911 | 1.62 |
| | Clay Treating Additive in Preflush | | |
| FAR-1 | DEP [1] | 778 | 2.34 |
| FAR-2 | DEP [2] | 964 | 3.41 |
| | Clay Treating Additive in Afterflush | | |
| FAR-1 | DEP [3] | 759 | 2.24 |

[1] 150 cc. of P 2 in lieu of P 1.
[2] 150 cc. of P 3 in lieu of P 1.
[3] 350 cc. of FAC 3 in lieu of FAC 2.

TABLE X.—FURFURYL ALCOHOL RESIN STUDIES 110° F., FRESH WATER, HYDRATED CLAYEY SANDS PROCEDURE (b)

Preflush, 150 cc. P 1.
Resin, 140 cc.
Spacer, 250 cc.
Afterflush, 350 cc. FAC 2.

| Formulation | Clay-Treating Additive In Resin | Clay in Sand, Percent | Consolidation Properties | |
|---|---|---|---|---|
| | | | Compressive Strength, p.s.i. | Permeability, Darcies |
| FAR-1 | None | 2 | 616 | 4.47 |
| FAR-2 | Diethyl phthalate | 2 | 509 | 4.89 |
| FAR-1 | None | 4 | 616 | 1.78 |
| FAR-2 | Diethyl phthalate | 4 | 545 | 2.42 |
| FAR-3 | Diallyl phthalate | 4 | 813 | 1.63 |

TABLE XI.—PHENOL FORMALDEHYDE RESIN STUDIES 110° F., BRINE HYDRATED 4% CLAYEY SANDS PROCEDURE (c)

| | Clay-Treating Additive In Resin | Consolidation Properties | |
|---|---|---|---|
| | | Compressive Strength, p.s.i. | Permeability, Darcies |
| Formulation: | | | |
| PRF-1 | None | 2,960 | 0.62 |
| PRF-2 | DEP | 3,270 | 1.15 |

Procedures

PROCEDURE FOR PREPARING CLAYEY SANDS

A 1 inch O.D. x 10 inches in length section of thin-walled glass tubing was filled with 5 grams of Oklahoma #1 sand at the bottom of the tube for effecting good fluid drainage at the perforation and 45 grams of dry Oklahoma #1 sand containing 4% by weight of bentonite (some tests with 10% to 2%). The exterior of the tube was tapped to pack the clayey sands to a height of 2.75 inches. Another 5 grams of clean Oklahoma #1 sand was placed on top of the clayey sand to inhibit "fluffing" upon release of air pressure.

A feeder bottle with a feed-in control was used to inject the hydration fluid (standard brine or fresh water). The fluid was fed slowly into the solids mix to permit the capillary action of the solids to draw the fluids slowly up into the column. The objective was to saturate the sand and clay particles as uniformly mixed so that they would remain so located (not segregate as to sizes). Once the pack was saturated, the remainder of the glass column was filled with hydration fluid, a glass rod was inserted into the perforated rubber stopper, and the clayey sand was allowed to saturate for a minimum of 24 hours at 80° F. Subsequently, a sufficient quantity of standard brine or fresh water (whichever applicable) was flushed through each test sand column, i.e., until a constant flow rate was attained. This permitted good packing. The test sand columns which varied excessively in flow rates from that expected were discarded. All test sands had to possess flow rates within a few cc./min. of each other. Otherwise the permeability retention values after consolidation would have been meaningless.

PROCEDURE FOR PREPARING CLEAN SANDS

Clean sands were packed in the same size glass enclosures as used for the clayey sands. A total of 45 grams of the sand was poured into the tubing and tapped down to a total height of 2.75″. Synthetic brine (150 cc.) was flushed through each sand column. Reproducible results have been obtained in many previous tests with clean sand when this procedure was used. Packing of clean sands does not entail the same difficulties as are connected with clayey sands.

PROCEDURE FOR PREPARING TEST CONSOLIDATIONS (a) This procedure entailed the use of 80° F. fluid injection temperatures and 96-hr. 180° F. resin consolidation environments. All treating fluids were injected into the test solids using 20 p.s.i.g. and 10 p.s.i.g. for clayey and clean sands respectively. This consolidation technique was concerned with the investigation of furan resins for consolidating bentonitic and clean sands. The treating solutions were flushed through the granular test solids. Each fluid except the spacer solution was displaced down to the top of the sand column prior to the addition and squeezing of the next fluid. A small volume of spacer solution was left above the test solids to serve as a cushion for the oncoming catalyst solution. In this way the catalyst was permitted to enter the solids evenly with a minimum amount of solids movement. (Pouring of catalyst solution directly on top of the sand column may promote a "dig out" or some slight rearrangement or particle movement. For good consolidations to occur all particles must be locked in place during the initial catalyst exposure to the sand. An instant resin hardening occurs at this time.)

(b) This procedure was used for preparing furfuryl alcohol resin consolidations of sand. Fluid injection temperatures were at 110° F. Consolidation or resin curing times of 96 hours at 140° F. were utilized. The remainder of the procedure was the same as described for Procedure (a). The treating solutions described were flushed through the test solids.

(c) This procedure was utilized for evaluating the phenol formaldehyde resin consolidating abilities. Fluids were injected into the test sands at 110° F. Consolidations were allowed to take place at 140° F. for a period of 96 hours. The rest of the procedure was the same as described for Procedure (a).

(d) The epoxy resin consolidations of sand were prepared using this procedure. Treating solutions were at 110° F. during injection. A consolidation time of 96 hours at 140° F. was allowed for each treated sand. The rest of the procedure was the same as described for Procedure (b).

PROCEDURE FOR CURING AND TESTING CONSOLIDATED CORES

After treatment by one of the four procedures described above, the core in its glass enclosure, with the perforation in the rubber stopper plugged, was placed in a constant temperature bath. The core at all times was covered with afterflush solution, except in the case of the epoxy resin cores on which a pressure was kept by the use of metal rods. After the required time interval had elapsed, the consolidated specimen was removed from the bath. The cores destined for compressive strength measurements were removed from their glass enclosures by breaking the glass and/or pushing the core out. Each of these cores was cut into two 1¼-inch segments with a diamond-studded saw. A compressive strength measurement was made on both consolidated portions whereby an average compressive strength was obtained. Cores subjected to air permeability measurements were first flushed with moderate volumes of isopropyl alcohol and naphtha and subsequently dried in a 200° F. oven. These cores were also cut into two 1¼-inch sections, and air permeability was run on each section. An average permeability was then obtained.

TABLE XII.—EPOXY RESIN STUDIES INTERNALLY CATALYZED, 110° F. TESTS 4% BRINE HYDRATED CLAYEY SANDS PROCEDURE (d)

| Formulation | Additive In | | Consolidation Properties | |
|---|---|---|---|---|
| | Resin | Preflush | Compressive Strength, p.s.i. | Permeability, Darcies |
| CONSOLIDATION GROUP 1 | | | | |
| Preflush: 100 cc. EP 1; 100 cc. EP 2; 70 cc. EP 3. Resin: 35 cc. | | | | |
| ER-1 | None | | 1,089 | 1.32 |
| ER-2 | DEP | | 1,286 | 1.77 |
| CONSOLIDATION GROUP 2 | | | | |
| Preflush: 100 cc. EP 1; 100 cc. EP 2; 70 cc. EP 4. Resin: 35 cc. | | | | |
| ER-1 | None | DEP (EP-4) | 1,455 | 1.69 |

EXAMPLE C

Three naturally consolidated formation sand cores vertically retrieved at varying depths from a well in the West Cameron off-shore Block 192 were evaluated for permeability retention and strength characteristics using diethyl phthalate as the clay treating additive. Each of the formation cores as received in the laboratory appeared well consolidated and X-ray diffraction indicated that the sands contained only minimum quantities of water sensitive clays.

Procedure

Synthetic brine and diesel oil were utilized as the fluids for determining permeabilities. Both solutions were filtered to remove any solids which might have been present. The composition of the brine solution was such that it was similar to many natural formation waters produced from oil bearing formations located in the Gulf Coast region. Brine components ratios were as follows: 240:18.1:1.34:1 parts by weight respectively of $H_2O$, NaCl, $CaCl_2$, and $MgCl_2 \cdot 6H_2O$. No. 2 diesel oil, essentially water-free, was found very satisfactory for these tests.

Cylindrical test speciments (3½₂" diameter x 1⅛" in length) were taken from each sample core. Drilling of samples was done with oil used as the lubricant. Subsequently the oil was removed from the exterior of the test cores by treatment with naphtha. The naphtha was removed from the specimens by flushing with isopropanol followed by vacuum and drying techniques. Each core was washed with brine solution by pulling a vacuum on the core. Brine then was allowed to fully saturate the core. In this manner the number of air pockets throughout the core was minimized. After each core had been exposed to 160° F. brine for 12 hours (to simulate clay hydration associated with formation conditions) it was subjected to brine permeability tests. An injection pressure of 10.18 inches of mercury was used for all flow measurements. The temperatures and viscosities of all test fluids were accurately recorded. No permeability measurements were taken until constant flow rate conditions had been reached. Prior to determining diesel oil permeabilities the brine was removed from the pore spaces with a diesel oil-Hyflo flush. The remainder of the procedure was the same as utilized for the brine measurements.

CONSOLIDATIONS PREPARED FOR PERMEABILITY MEASUREMENTS

Each core was sleeved with hardened plastic, i.e., in a manner which permitted both ends to be fully open to fluid movements. The jacket of plastic was placed around each core by using a special epoxy resin-containing formula, commonly used to enclose cores for permeability measurements, without invading the pores of the test specimen. The cores and their sleeve enclosures were contained within separate section of a ⅛" I.D. thick wall glass tubing. A seal was facilitated between the outside of the test core and the interior wall of the glass treating tubes. A silane coupling agent was included in the resin formulation to promote a chemical bond to the glass and sand surfaces. The resinous enclosure as hardened possessed properties which would permit it to expand and retract with changes in temperatures.

In this manner all of the test fluids were directed through the entire length of each core.

CONSOLIDATION PREPARED FOR COMPRESSIVE STRENGTH TESTS

The core was enclosed in a Buna N rubber sleeve within a 1⅛" I.D. glass thick wall cylinder. A good seal was made between the exterior of the test core and the inside wall of the glass cylinder. This set-up permitted the routing of all the consolidating fluids through the entire length of the core. After consolidation the core was easily retrieved for compressive strength measurements by breaking away the glass tubing and removing the Buna N rubber sleeve.

CONSOLIDATION

Each consolidation was prepared using 160° F. treating fluids of Example B as follows:

|   | Cc. |
|---|---|
| (1) Diesel oil containing .1% Hyflo | 100 |
| (2) Consolidating fluid | 100 |
| (3) Diesel oil containing 0.5% Hyflo | 500 |
| (4) Diesel oil-catalyst solution containing 0.5% Hyflo | 500 |

The diethyl phthalate clay treating additive was used in a ratio of 15 gallons of additive to each 160 gallons of consolidating fluid.

Injection pressure with all fluids was 50 p.s.i.g. This pressure was held on each specimen for 15 minutes prior to allowing a consolidation period of 48 hours at 160° F. and one atmosphere. During the resin curing period the pore spaces were filled with catalyst solution.

AFTER CONSOLIDATION

The consolidated cores were treated with large volumes of water to remove the excess acid catalyst deposited by extraction techniques associated with the process. This simulated conditions in the formation wherein the acid catalyst is removed by either formation oil or water since it is soluble in both. However, water dissolves the acid more rapidly. Brine permeability measurements then were taken on each core using the conditions as aforedescribed. After the brine tests the cores were treated with isopropanol and naphtha. After drying the consolidations diesel oil permeabilities were run.

Results

From Table XIII hereinbelow, it can readily be seen that permeability retention values were appreciably higher when the consolidating fluid contained diethyl phthalate clay treating additive. Since the cores evaluated did not contain any significant quantities of water swellable clays no great stimulation in permeability after resin hardening was expected. Permeability of formation sands containing hydrated clays may be increased by treatment with a resin consolidating fluid containing the clay treating additive of this invention. Single test data as seen in Table XIV indicated that certain consolidated formations may be strengthened with a similar treatment.

TABLE XIII.—PERMEABILITY DATA

|  | Core Depth | Perm. Before Treating Darcies | | Additive | Perm. After Treating Darcies | | Retention of Perm. After Treating, Percent | |
|---|---|---|---|---|---|---|---|---|
|  |  | Brine | Oil |  | Brine | Oil | Brine | Oil |
| Test No.: |  |  |  |  |  |  |  |  |
| 1 | 9,588' | 1.266 | 1.915 | No | .852 | 1.348 | 67.2 | 70.4 |
| 2 | 9,588' | 1.196 | 1.936 | Yes | 1.225 | 2.423 | 102.4 | 125 |
| 3 | 9,594' | 2.304 | 5.851 | No | [1] 0.84 | [1] 2.705 | [1] 36.5 | [1] 46.2 |
| 4 | 9,594' | 2.714 | 5.439 | Yes | 2.495 | 4.844 | 91.9 | 89.1 |

[1] Difficulty was encountered with the treating enclosure concerning this core. Results may be in error in that permeability retention values with the regular consolidating solution are normally higher. No duplicate test could be made because of an insufficient supply of test sample.

TABLE XIV

|  | Core Depth (feet) | Compressive Strength Data (p.s.i.) | | |
|---|---|---|---|---|
|  |  | Before Treating | Clay Treating Additive | After Treating |
| Test No.: |  |  |  |  |
| 5 | 9,592 | 455 |  |  |
| 6 | 9,592 |  | Yes | 1,807 |

EXAMPLE D

A successful field job using the composition and method of the present invention was performed in a well in Wilson County, Texas. The zone consolidated was a two foot interval in the Poth sand. The formation sand contained water sensitive clays and was moderately coarse grained, with a moderate amount of material or sands passing a 325 mesh (U.S. Standard Sieve Series) screen. The well was a gas injection well in a secondary recovery project. Injection pressures had increased, and this was believed to have been caused by compaction. Occasional back flow had caused sand production.

Treatment

The zone was packed with 25 sacks of 40–60 mesh sand carried in 2000 gallons of lease crude. A four barrel plastic sand consolidation job was then applied.

| Materials | Amount Used | |
|---|---|---|
|  | Barrels | Gallons |
| Preflush, Diesel oil with 1% by volume of Halliburton Hyflo | 20 | 840 |
| Plastic, Furfuryl Alcohol Resin (1 drum); gamma aminopropyltriethoxy silane (3 quarts); furfuryl alcohol (2 drums); diethyl phthalate (15 gallons); Hyflo (1 gallon); water (5 gallons) | 4 | 168 |
| Spacer, Diesel oil with 0.5% by volume of Hyflo | 5 | 210 |
| Afterflush (catalyst), 100 pounds of trichloroacetic acid dissolved in 20 barrels of diesel oil with 0.5% by volume of Hyflo | 20 | 840 |
| Displacement, Diesel oil | 2 | 84 |

| Operation | Tubing Pressure, p.s.i. |
|---|---|
| Break down formation | 525 |
| Start sand at 1#/gal | 500 |
| Start sand at 1.5#/gal | 600 |
| Start sand at 2#/gal | 900 |
| Cut sand, Start flush | 1,300 |
| Flush complete | 1,350 |
| Mix plastic: |  |
| Start preflush (840 gallons) | 300 |
| Start plastic (4 barrels) | 0 |
| Start spacer (210 gallons) | 210 |
| Start afterflush (840 gallons) | 210 |
| Start Flush or displacement (84 gallons) | 210 |

U.S. Patents Nos. 3,199,590, 3,221,814, 3,209,826 and 3,100,527 describe resin systems or sand consolidation methods suitable for use with the instant invention, and these patents are specifically incorporated herein.

U.S. application Ser. No. 260,826 filed Feb. 25, 1963 describes a variety of silanes or organo silicon compounds suitable for use with this invention, and said application is also specifically incorporated herein.

For simplification of the claims, an organic ester is defined as one described under "Description of the Preferred Embodiments" hereinabove.

Broadly, the present invention relates to the treating of earth formations with an organic ester as defined herein, and especially to a method of consolidating or strengthening clayey-sand formations using said ester in a preflush solution, with a consolidating fluid or in an afterflush solution.

What is claimed is:

1. A method of treating an earth formation for maintaining and/or increasing the permeability thereof, comprising the step of injecting into said formation an ester of an aromatic polycarboxylic acid.

2. The method of claim 1, wherein said ester has the following general formula:

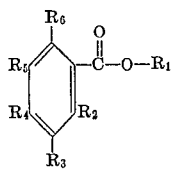

wherein, $R_1 =$ 1 to 8 carbons atoms in a linear, alicyclic, aromatic, branched chain, or unsaturated arrangements or a combination thereof;

$R_2$, $R_3$ and $R_6 =$ H or

$R_5$ and $R_6 =$ H,

or $R_5$ and $R_6$ together = fused benzene ring or fused naphtha ring.

3. The method of claim 1, wherein said ester is diethyl phthalate.

4. In a method of permeably consolidating loose sands or strengthening naturally permeable consolidated formations, the step of treating said loose sands or said formations with an ester of an aromatic polycarboxylic acid.

5. The method of claim 4, wherein said ester has the following general formula:

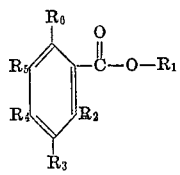

wherein, $R_1 =$ 1 to 8 carbon atoms in a linear, alicyclic, aromatic, branched chain, or unsaturated arrangements or a combination thereof;

$R_2$, $R_3$ and $R_6 =$ H or

$R_5$ and $R_6 =$ H,

or $R_5$ and $R_6$ together = fused benzene ring or fused naphtha ring.

6. The method of claim 4, wherein said ester is diethyl phthalate.

7. A method of permeably consolidating loose sands containing clays or strengthening naturally consolidated clayey formations with a resin or resin forming consolidating fluid wherein an organic ester is added to said consolidating fluid for treating the clays in said sands or formations in an amount sufficient to provide a permeability of the consolidated formations greater than that provided by a similar consolidating fluid without the ester clay treating additive.

8. The method of claim 7, wherein the ester is selected from the group consisting of dimethyl phthalate, diethyl phthalate, dibutyl phthalate, dioctyl phthalate, diallyl phthalate, diphenyl phthalate, diallyl terephthalate, diethyl terephthalate, diethyl oxalate and ethyl malonate.

9. The method of claim 7, wherein the consolidating fluid is a resin or resin forming mixture selected from the group consisting of furfuryl alcohol resins, phenol aldehyde resins, urea aldehyde resins, epoxy resins, or mixtures thereof.

10. A method of consolidating an incompetent subterranean formation consisting of the steps of:
(a) dispersing a quantity of an organic ester in a liquid resinous composition to form a consolidating fluid; and,
(b) introducing said consolidating fluid into said incompetent formation whereupon said consolidating fluid sets and thereby consolidates said formation.

11. A method of consolidating loose sands or strengthening natural earth formations, comprising the steps of:
(a) dispersing a quantity of a clay treating additive in a consolidating fluid selected from the group consisting of resins and resin forming mixtures; said clay treating additive being an organic ester;
(b) introducing the consolidating fluid into the loose sands or formations; and,
(c) causing the consolidating fluid to set, thereby consolidating the sands or formation into a mass having a relatively high compressive strength.

12. The method of claim 11, wherein the consolidating fluid is selected from the group consisting of furfuryl alcohol resins, phenolic resins, urea formaldehyde resins, epoxy resins, urethanes and mixtures thereof, and said clay treating additive is in an amount sufficiently to produce a permeable consolidation of the loose sands or formation having a greater permeability than a consolidation of the loose sands or formation with the same consolidating fluid containing no clay treating additive.

13. The method of claim 11, wherein the clay treating additive is selected from the group consisting of dimethyl phthalate, diethyl phthalate, dibutyl phthalate, dioctyl phthalate, diallyl phthalate, diphenyl phthalate, diallyl terephthalate, diethyl terephthalate, diethyl oxalate and ethyl malonate.

14. A method of consolidating loose sands or strengthening naturally consolidated formations, comprising the steps of treating said loose sands or said formations with an ester of an aromatic polycarboxylic acid and thereafter introducing a consolidating fluid into the loose sands or formations.

15. A method of consolidating loose sands or strengthening naturally consolidated formations, comprising the step of introducing into said loose sands or formations a consolidating fluid containing an ester of an aromatic polycarboxylic acid.

16. The method of claim 15, wherein the consolidating fluid contains a silane.

17. The method of claim 15, wherein the composition contains a surfactant.

18. A method of consolidating loose sands or strengthening naturally consolidated formations comprising the steps of introducing a consolidating fluid into the loose sands or formations and thereafter introducing into said loose sands or formations an ester of an aromatic polycarboxylic acid.

References Cited

UNITED STATES PATENTS

| | | | |
|---|---|---|---|
| 3,051,236 | 8/1962 | Mitch et al. | 166—30 |
| 3,199,590 | 8/1965 | Young | 166—33 |
| 3,202,214 | 8/1965 | McLaughlin | 166—30 |
| 3,250,330 | 5/1966 | Smith | 166—33 |
| 3,282,338 | 11/1966 | Walther et al. | 166—33 |
| 3,358,757 | 12/1967 | Holmes | 166—9 |

STEPHEN J. NOVOSAD, *Primary Examiner.*

U.S. Cl. X.R.

166—42; 252—8.55